Sept. 26, 1961   M. C. KLAPES   3,001,636
APPARATUS FOR CHANNELING ARTICLES
Filed Jan. 15, 1959   3 Sheets-Sheet 1

INVENTOR.
MICHAEL C. KLAPES
BY Porter, Chittick & Russell
ATTORNEYS

Sept. 26, 1961 M. C. KLAPES 3,001,636
APPARATUS FOR CHANNELING ARTICLES
Filed Jan. 15, 1959 3 Sheets-Sheet 2
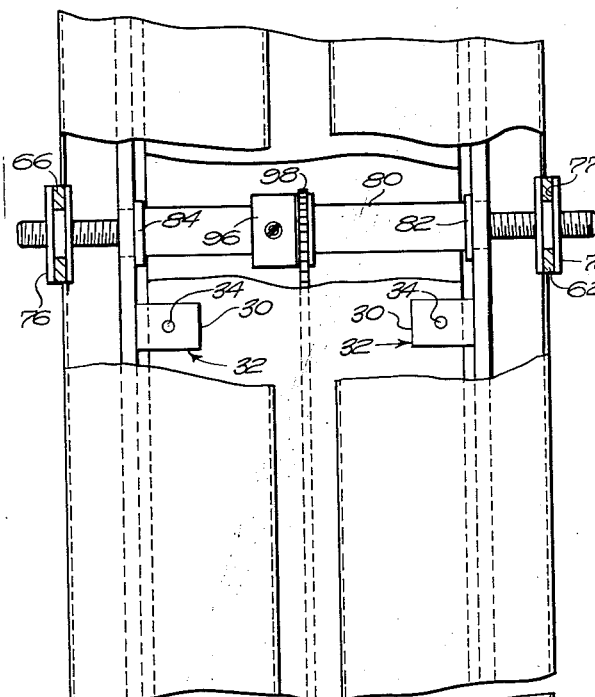
FIG. 2
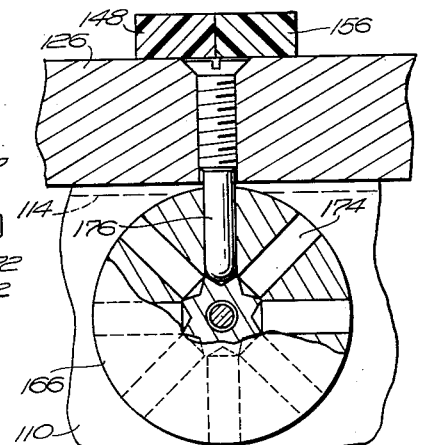
FIG. 5
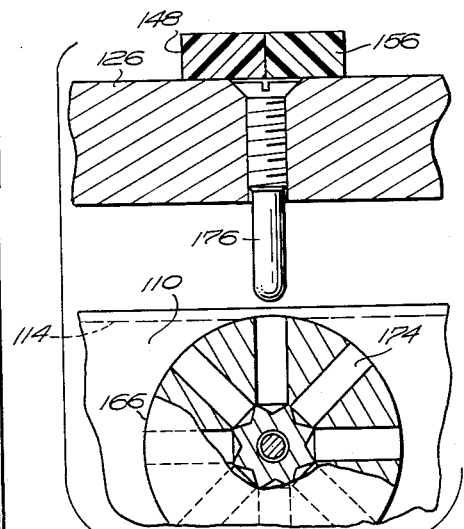
FIG. 6
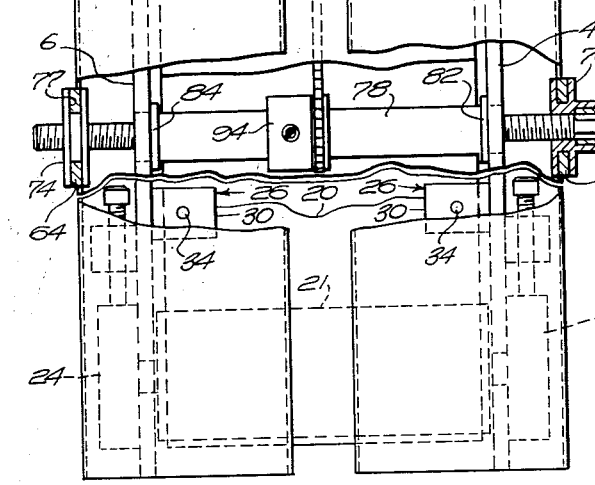
INVENTOR.
MICHAEL C. KLAPES
BY Porter, Chittick & Russell
ATTORNEYS

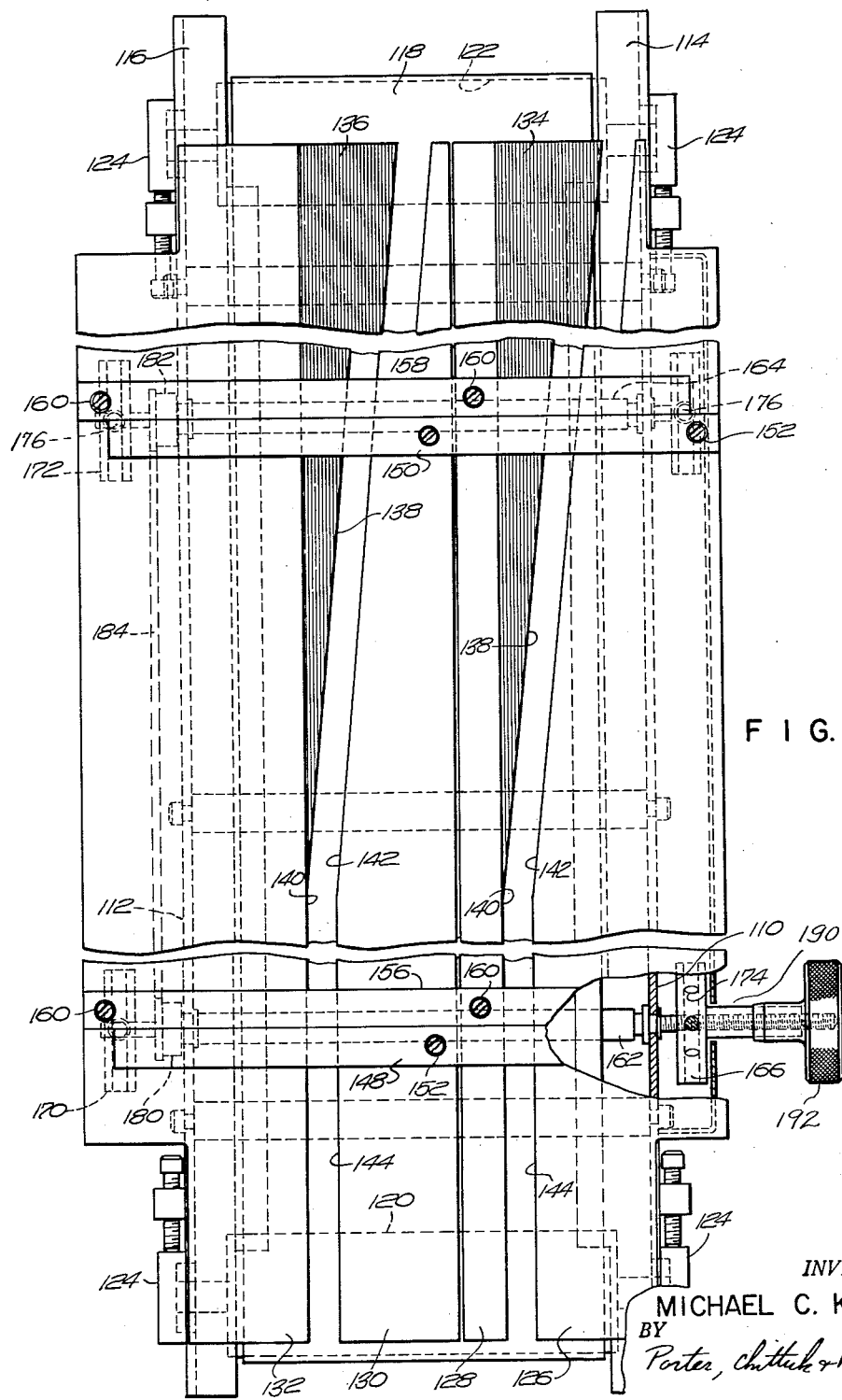

United States Patent Office 3,001,636
Patented Sept. 26, 1961

---

3,001,636
APPARATUS FOR CHANNELING ARTICLES
Michael C. Klapes, Lynnfield Center, Mass., assignor to Delta Engineering Corporation, Melrose, Mass., a corporation of Massachusetts
Filed Jan. 15, 1959, Ser. No. 787,025
10 Claims. (Cl. 198—204)

This invention relates to mechanism for channeling moving articles and more particularly to a new and improved guide assembly for channeling moving articles into single-file alignment wherein the assembly comprises a pair of guides defining therebetween a channel for guiding moving articles and means for moving the guides toward and away from each other to vary the channel width without shifting the center line of the channel.

In many machines having a supply hopper for articles to be handled individually by the machine, it is necessary to provide means for segregating the articles after they are discharged from the hopper so that they may be advanced individually to one or more stations where some predetermined function such as counting, marking, or wrapping is performed. The segregating means often takes the form of one or more pairs of guide members which define channels just wide enough to accommodate the articles in question. Since often the same machine may be used to handle articles of different sizes, it has been found advantageous to make the guide members movable so that the channel defined by the guide members may be adjusted in width. Unfortunately, adjustment of the guide members is time consuming, and where the articles to be handled are quite small, adjustment of the guides must be precise.

Moreover, in some cases it is necessary that changes in channel width be effected without shifting the center line of the channel. For example, where articles are to be counted by means of a light beam detector, optimum operation of the detector may result only when the articles pass through a certain portion of the light beam. If in adjusting the guides to vary channel width the center line of the channel is shifted so that articles will not pass through the desired portion of the light beam, the detector may not function as well as it should, and an erroneous count may result.

Accordingly, the primary object of this invention is to provide a guide mechanism comprising a pair of guide members spaced from each other and defining therebetween a channel through which articles travel, and means for moving both guide members equal amounts with respect to a given center line.

A more specific object of this invention is to provide in combination with a counting machine having a conveyor belt for conveying articles in a given direction and a counting station for counting articles delivered by the conveyor belt, a pair of guide members positioned in parallel relation with the conveyor belt and defining a channel along which articles on the conveyor are guided, means supporting the guide members, and means for moving the guide members equal amounts toward and from the center line of said channel.

Other objects and many of the attendant advantages of this invention will be readily appreciated as the same becomes better understood by reference to the following detailed description when considered in connection with the accompanying drawings, wherein:

FIG. 2 is a plan view of the article guide assembly illustrated in FIG. 1;

FIG. 3 is a cross section of the construction of FIG. 2;

FIG. 3A is an enlarged perspective view of one of the arms which assist in moving the guides toward and away from each other;

FIG. 4 is a plan view of a preferred form of the invention; and

FIGS. 5 and 6 illustrate how the guides and guide-moving means of FIG. 4 are coupled and uncoupled.

Figure 1:
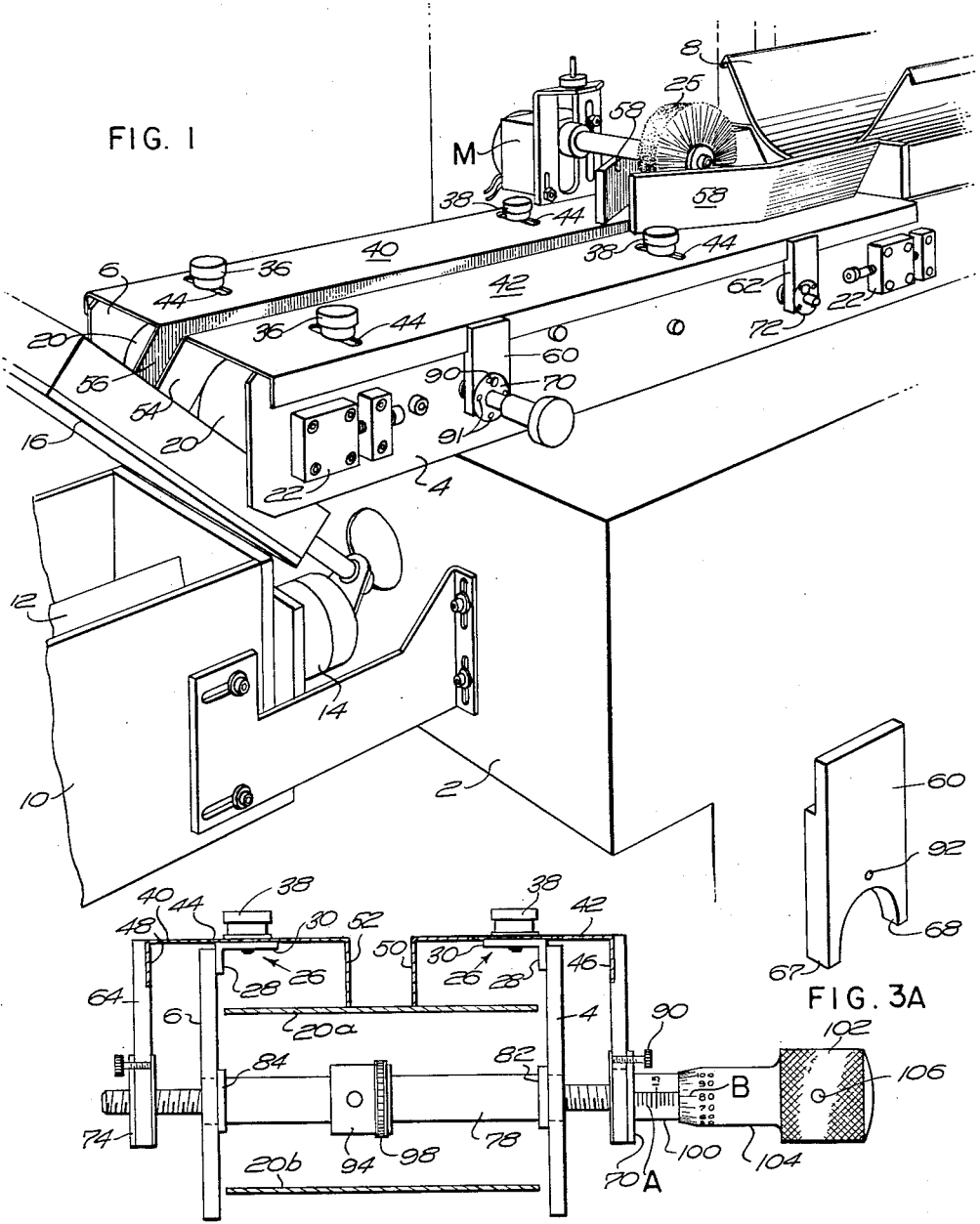
FIG. 1 is a perspective view of a portion of an article counting machine embodying one form of the present invention.

Referring now to FIGS. 1 and 3, there is shown a portion of a conventional article counting machine embodying the one form of the present invention. The machine comprises a frame 2 which supports a pair of fixed, parallel-spaced walls 4 and 6 which extend from below a vibratory delivery pan 8 to a discharge point proximate to a batcher device which includes a housing 10 open at the top and bottom that is secured to frame 2, a vane-type shutter 12 mounted for turning movement in the housing and having a shaft (not shown) which is rotated by a pair of rotary solenoids 14 attached to its opposite ends. An electric eye assembly 16 is located between the walls 4 and 6 and the housing 10. The electric eye assembly is connected to a counter (not shown) which counts the number of times the beam of light of the electric eye system is broken by articles discharged into the batcher housing.

Articles discharged from the delivery pan 8 are transported toward and discharged into the batcher housing 10 by an endless belt 20 having upper or lower horizontal runs 20a and 20b located between walls 4 and 6. Belt 20 is carried by two pulleys or rolls 21 having axles whose ends are journaled in two pairs of bearing members 22 and 24 carried by walls 4 and 6. Only one pulley, the one nearest the batcher housing, is shown in the drawings. However, it is to be understood that another pulley is located close to the delivery pan 8. A motor M drives the belt through a drive system not shown and also drives a rotating brush 25 in a counterclockwise direction (FIG. 1). Brush 25 keeps articles discharged from delivery pan 8 from piling up in a group on the conveyor.

To the extent just described, the apparatus of FIG. 1 is old and, with the exception of the delivery pan 8, is shown in the copending patent application of Eric G. Cleveland and Archibald D. Standley, Jr., Serial No. 557,819, filed January 6, 1956, for Method and Apparatus For Counting and Packaging Articles.

Referring now to FIGS. 1, 2, and 3, two pairs of L-shaped brackets 26 comprising vertical legs 28 and horizontal legs 30 are attached to walls 4 and 6 adjacent their front ends. A second pair of identical brackets 32 are attached to walls 4 and 6 just forward of bearing members 24. The horizontal legs 30 of these brackets 26 and 32 have holes 34 to receive thumb screws 36 and 38. The horizontal legs of these brackets slidably support two parallel-opposed guide members 40 and 42. These guide members have elongated slots 44 for thumb screws 36 and 38. Slots 44 permit the guides to be moved forward and away from but not longitudinally of each other. These guide members have depending flanges 46 and 48 at their outer edges and depending flanges 50 and 52 at their inner edges. Flanges 46 and 48 are outside of walls 4 and 6, and the width of the guides is such that flanges 46 and 48 will touch walls 4 and 6 only when flanges 50 and 52 are brought into contacting relation. Flanges 50 and 52 terminate just short of the upper run 20a of the conveyor belt and include forward portions 54 and 56 that guide articles even as they are discharged from the conveyor belt. Rearwardly of thumb screws 38, guides 40 and 42 have auxiliary upstanding guide sections 58 that converge at their forward ends so as to act as a funnel for articles discharged from pan 8 onto the belt 20.

Attached to flange 46 is a pair of identical depending arms 60 and 62. An identical pair of arms 64 and 66 is attached to flange 48. The lower ends of these arms have a concave slot defined by two portions 67 and 68 (FIG. 3A) which functions as a yoke. The yoke ends of arms 60, 62, 64, and 66 accommodate circular nuts 70, 72, 74, and 76 respectively. These nuts each have a peripheral groove 77 (FIG. 2). Nuts 70 and 74 are screwed onto opposite ends of a shaft 78, and nuts 72 and 76 are screwed onto opposite ends of a shaft 80. Shafts 78 and 80 have left-hand threads for nuts 70 and 72 and right-hand threads for nuts 74 and 76. The intermediate portions of shafts 78 and 80 have a larger diameter than the threaded end portions. These shafts are fitted with bearings 82 and 84 which prevent axial but not rotative movement of the shafts. The nuts are locked against rotation by screws 90 which are screwed into tapped holes 91 in the nuts and extend through openings 92 in arms 60, 62, 64, and 66.

Sprockets 94 and 96 are secured to the intermediate portions of shafts 78 and 80 and are connected by a chain 98. Thus, rotation of one shaft causes corresponding rotation of the other shaft. Shaft 78 is longer at one end, having an extension 98 of reduced diameter. Nut 70 has a cylindrical coaxial sleeve or extension 100 surrounding extension 98 of shaft 78. A dial knob 102 having an axially extending sleeve 104 which rotatably surrounds nut extension 100 is fixed on extension 98 of shaft 78 by means of a set screw 106. As seen in FIG. 3, an axially extending scale A is engraved on nut sleeve 100, and a circumferentially extending scale B is engraved on knob sleeve 104. Scale A is graduated in tenths of an inch, based upon the width of the channel determined by the spacing between flanges 50 and 52, and scale B is graduated in thousandths of an inch, based on the same channel width. Accordingly, one revolution of the knob produces a change on scale A of one-tenth of an inch, the amount of change in channel width.

In practice, the guides are centered manually only once; namely, when they are installed. The arms 60—66 are positioned in the grooves 77 of the nuts 70—76, and then the nuts are turned until the flanges 50 and 52 are touching each other and are aligned with the midpoint of the electric eye light beam or with the center line of the belt if the belt is already aligned with midpoint of the light beam. After the guides have been aligned, screws 90 are screwed into holes 91 in the nuts and through spring 92 in the arms, thereby locking the nuts against rotation relative to the arms. Thereafter, rotation of knob 102 will cause the two guides to move toward or away from each other at the same rate, thereby preserving their symmetrical spacing from the center line of the belt or of the midpoint of the light beam. The micrometer-type knob assembly facilitates making predetermined guide settings. For example, when an article of a certain size is run on the machine for the first time, the setting of knob 102 is recorded and then used as a reference whenever the same size article is run again. This saves operator time and promotes greater use of the machine.

FIGS. 4–6 show a preferred form of the invention combined with a conveyor system of the type illustrated in FIGS. 1–3. In this case, two substantially identical sets of guides are provided so as to define two channels instead of one. However, the principle of operation is the same.

As illustrated in FIGS. 4–6, the conveyor system comprises two side walls 110 and 112 having inturned horizontal flanges 114 and 116 respectively at their top edges. The conveyor belt which transports the articles is shown at 118, and the rolls or pulleys which support the belt are shown at 120 and 122. These rolls are supported by bearings 124 attached to walls 110 and 112. Although not shown, it is to be understood that one or both of the belt pulleys are driven by a motor in the same manner that motor M drives the belt 20 in the preferred form of the invention.

The guide members are identified at 126, 128, 130, and 132, and are constructed preferably of clear plastic. However, they may be made of steel, aluminum, or any other suitable material. Guides 126 and 128 define one channel, and guides 130 and 132 define the second channel. Guides 128 and 132 are characterized by wedge-shaped portions 134 and 136, each having an edge surface 138 that runs obliquely relative to the axis of movement of the belt but is parallel to the plane of the upper run of the belt. Guides 128 and 132 also have a straight vertical edge 140 that joins with and is a continuation of edge 138.

Guides 126 and 130 have vertical edges 142 and 144 in opposed spaced relation with edges 138 and 140 respectively of guides 128 and 132. Thus, the guides define two separate channels. These channels are of uniform width at the bottom but vary in width above the bottom along the length of edges 138 due to the sloping top surfaces of wedge-shaped portions 134 and 136.

Guides 126 and 132 rest on flanges 114 and 116 respectively. Guide 130, corresponding generally in shape to guide 126, is coupled to the later by two bars 148 and 150. Screws 152 secure guides 126 and 130 respectively to bars 148 and 150. It is significant that bars 148 and 150 overlap guides 128 and 132. These guides are also coupled to each other by bars 156 and 158 and screws 160. Bars 156 and 158 overlap guides 126 and 130. Because of the overlapping of all the guides by all of the bars, the four guides cooperate to support each other on flanges 114 and 116 so as to remain in a horizontal plane parallel and proximate to the upper run of belt 118.

Rotatably anchored in walls 110 and 112 are two shafts 162 and 164. The opposite ends of both shafts are threaded in the same manner as shafts 78 and 80 of FIG. 2. Screwed onto one threaded ends of these shafts are nuts 166 and 168. Screwed onto the opposite ends of these shafts are nuts 170 and 172. These nuts are formed with a series of equally spaced radial holes 174 to receive screw pins 176 carried by the guides 126 and 130. It is to be noted that guide 126 has two pins, one for nut 166 and the other for nut 168. Guide 132 also has two screw pins 176, one for nut 170 and one for nut 168. Pins 176 lock nuts 166—172 against rotation. More than one hole 174 is provided in each nut so that when the nut is advanced or backed off on its shaft, a hole will always be at or close to 12 o'clock position to receive the pin 176 associated with the nut.

As in the first embodiment, the two shafts are coupled together by a chain drive. Sprockets 180 and 182 are mounted on shafts 162 and 164 between wall 112 and nuts 170 and 172. A chain 184 couples the two sprockets so that as shaft 162 is rotated, shaft 164 will rotate in the same direction. The sprockets are of equal size so that both shafts will turn at the same rate.

This preferred form of the invention has the same type of micrometer adjustment as the embodiment of FIGS. 1–3. In this case, nut 166 is provided with a sleeve 190 having markings (not shown) corresponding to the markings on sleeve 100 shown in FIG. 3, and an adjusting knob 192 identical to knob 102 of FIG. 3 is affixed to shaft 162.

The two forms of the invention operate in the same manner, except that in the second form, rotation of the adjusting knob causes a change in the width of two channels instead of one. The chief advantage of the second form is that the guide members may be removed simply by lifting them to remove their pins 176 from the nuts 166—172, whereas it is necessary to release screws 90 before the guides of the first embodiment can be removed.

Although only one pair of guides are shown in the first embodiment, it is to be understood that additional pairs of guides may be provided by employing bars like bars 148, 150, 156, and 158. Similarly, additional pairs of guides may be added to the second form of the invention if bars 148, 150, 156, and 158 are increased in length for this purpose.

Obviously, many modifications and variations of the present invention are possible in the light of the above teachings. Therefore, it is to be understood that the invention is not limited in its application to the details of construction and arrangement of parts specifically described or illustrated, and that within the scope of the appended claims, it may be practiced otherwise than as specifically described or illustrated.

I claim:

1. In combination with an endless belt conveyor having a substantially straight run, a pair of guide members for channeling articles on said substantially straight run into a single column, each guide member movable toward and away from the other guide member, means supporting said guide members in a plane parallel to the plane of said straight run, first and second means connected to both guide members at spaced-apart points for moving said guides toward and away from each other, and third means for indicating the instantaneous spacing between said guide members, said third means operatively connected to said first means.

2. In combination with an endless conveyor having a horizontal run, apparatus for channeling articles deposited on said run into a single column, said apparatus comprising first and second guide members having opposed parallel edges defining an article-guiding channel, first and second movable means supporting said first guide member at two different points for movement toward and away from said second guide member, third and fourth movable means supporting said second guide member at two different points for movement toward and away from said first guide member, first rotatable means for moving said first and third movable means toward and away from each other by equal amounts, second rotatable means for moving said second and fourth movable means toward and away from each other by equal amounts, means connected between said first and second rotatable means for driving said second rotatable means in the same direction and at the same rate as said first rotatable means, and means for indicating the spacing between said parallel edges, said indicating means comprising a first indicating element attached to and movable with said first movable means and a second indicating element cooperating with said first indicating element and attached to and movable with said first rotatable means.

3. In combination with an endless conveyor belt having upper and lower runs, means for channeling articles on the upper run of said belt ito single-file alignment, said channeling means comprising a pair of guide members having opposed side edges, means slidably supporting said guide members in a plane parallel to said upper run, means preventing longitudinal movement of said guide members, a pair of shafts extending transversely of said conveyor and guide members, said shafts positioned between said upper and lower runs, each shaft having a right-hand thread on one end and a left-hand thread on the other end, a nut screwed onto each thread of each shaft, each nut having a plurality of identical holes arranged symmetrically above its axis, a pair of bracket members attached to each guide member, a plurality of elongated means each locking one of said nuts to a different one of said brackets, said elongated means removably situated in selected holes of said nuts, means for rotating one of said shafts, and drive means connecting said shafts for rotating the other shaft in the same direction and in the same degree as said one shaft.

4. In combination with an endless conveyor belt having upper and lower runs, means for channeling articles into single-file alignment on the upper run of said belt, said means comprising a pair of guide members disposed in a plane parallel to said upper run, said guide members having opposed longitudinally extending side edges defining a channel along which articles on said conveyor belt are conveyed, means slidably supporting said guide members for movement toward and away from each other in said plane, and rotatable means operative when turned in one direction to move said guide members away from each other and operative when turned in the opposite direction to move said guide members toward each other, said rotatable means including a rotatable shaft, a knob on the end of said shaft, a first graduated scale on said knob, and a second graduated scale carried by said shaft, said first and second scales together providing an instantaneous indication of the width of said channel as said guide members are moved relative to each other.

5. In combination with an endless conveyor belt having upper and lower runs, means for channeling articles on the upper run of said belt into single-file alignment, said channeling means comprising a pair of guide members having opposed side edges, means slidably supporting said guide members in a plane parallel to said upper run, means preventing longitudinal movement of said guide members, a pair of rotatable shafts extending transversely of said conveyor and guide members, said shafts positioned between said upper and lower runs and restrained against axial movement, each shaft having a right-hand thread on one end and a left-hand thread on the other end, a nut screwed onto each thread of each shaft, each nut having a plurality of radial bores arranged symmetrically about its axis, a pair of depending elements secured to each guide member, said depending elements inserted in selected bores of said nuts whereby to lock said nuts against rotation, means for rotating one of said shafts, and drive means connecting said shafts for rotating the other shaft in the same direction and in the same degree as said one shaft.

6. In combination with an endless conveyor belt having upper and lower runs, means for channeling articles on the upper run of said belt into single-file alignment, said channeling means comprising a pair of guide members having opposed side edges, means slidably supporting said guide members in a plane parallel to said upper run, means preventing longitudinal movement of said guide members, a pair of rotatable shafts extending transversely of said conveyor and guide members, said shafts positioned between said upper and lower runs and restrained against axial movement, each shaft having a right-hand thread on one end and a left-hand thread on the other end, a nut screwed onto each thread of each shaft, each nut having a peripheral groove, a pair of depending elements secured to each guide member, said depending elements each having an arcuate edge surface located in the peripheral groove of one of said nuts, a pin releasably locking each nut against rotation relative to the depending element associated therewith, means for rotating one of said shafts, and drive means connecting said shafts for rotating the other shaft in the same direction and in the same degree as said one shaft.

7. In combination with an endless conveyor having a horizontal run, first, second, third, and fourth guide members, said first and second guide members defining a first article-guiding channel, said third and fourth guide members defining a second article-guiding channel, first and second movable means supporting said first guide member at two different points for movement toward and away from said second guide member, third and fourth movable means supporting said fourth guide member at two different points for movement toward and away from said first guide member, first rotatable means for moving said first and third movable means toward and away from each other by equal amounts, second rotatable means for moving said second and fourth movable means toward and away from each other by equal amounts, means connected between said first and second rotatable means for driving said second rotatable means in the same direction and at the same rate as said first rotatable means, a first bar connected between said first and third guide members for holding said first and third guide members fixed in parallel relation to each other, and a second bar connected between said second and fourth guide members for holding said second and fourth guide members fixed in parallel relation to each other, said first bar extending across said second guide member and overlapping said fourth guide member, said second bar extending across said third guide member and overlapping said first guide member, said bars cooperating to hold said four guide members in a common plane.

8. The combination of claim 7 wherein said first and third guide members have wedge-shaped sloping surfaces facing said second and fourth guide members respectively at their upstream ends, the slope of said wedge-shaped surfaces increasing progressively in the direction of movement of said horizontal run, said wedge-shaped surfaces having a bottom edge running obliquely relative to the longitudinal center line of said conveyor.

9. In combination with an endless conveyor, first, second, third, and fourth parallel guide members arranged from left to right in the order named, first and second means connecting together said first and third guide members and said second and fourth guide members respectively, third and fourth means slideably engaged by said first and fourth guide members rsepectively for supporting all of said guide members in a plane parallel to the plane of said conveyor, first and second rotatable shafts disposed in parallel spaced relation to each other and extending transversely of said conveyor and guide members, means rotatably supporting said shafts and restraining said shafts against axial movement, means connecting said shafts for causing one shaft to rotate with the other, and means connecting said first and fourth guide members to each of said first and second shafts for causing said first and third guide members to move toward said second and fourth guide members when said shafts are rotated in one direction and away from said second and fourth guide members when said shafts are rotated in the opposite direction.

10. In combination with an endless conveyor, a pair of parallel guide members disposed parallel to the path of movement of said conveyor, means supporting said guide members for movement toward and away from each other, means operatively connected to said supporting means for causing said supporting means to move said guide members toward and away from each other, one of said guide members having a wedge-shaped sloping surface facing the other guide member at its upstream end, the slope of said wedge-shaped surface increasing progressively in the direction of movement of said conveyor, said wedge-shaped surface having a bottom edge running obliquely relative to the longitudinal center line of said conveyor.

References Cited in the file of this patent

UNITED STATES PATENTS

| | | |
|---|---|---|
| 1,857,566 | Perry | May 10, 1932 |
| 2,308,591 | Duffy et al. | Jan. 19, 1943 |
| 2,625,745 | Stedman | Jan. 20, 1953 |
| 2,706,034 | Russell et al. | Apr. 12, 1955 |